United States Patent
Doyle et al.

(10) Patent No.: US 9,367,359 B2
(45) Date of Patent: *Jun. 14, 2016

(54) OPTIMIZED RESOURCE MANAGEMENT FOR MAP/REDUCE COMPUTING

(75) Inventors: Ronald P. Doyle, Research Triangle Park, NC (US); David L. Kaminsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/828,245

(22) Filed: Jun. 30, 2010

(65) Prior Publication Data

US 2012/0005345 A1    Jan. 5, 2012

(51) Int. Cl.
*G06F 15/173* (2006.01)
*G06F 9/50* (2006.01)
*H04L 12/24* (2006.01)

(52) U.S. Cl.
CPC .......... *G06F 9/5066* (2013.01); *H04L 41/0813* (2013.01); *H04L 41/0896* (2013.01)

(58) Field of Classification Search
CPC ............... H04L 41/0813; H04L 41/08096; G06F 9/5066
USPC ........................................................ 709/226
See application file for complete search history.

(56) References Cited

U.S. PATENT DOCUMENTS

| 7,194,543 | B2 | 3/2007 | Robertson et al. | |
|---|---|---|---|---|
| 2005/0256946 | A1* | 11/2005 | Childress et al. | 709/223 |
| 2006/0274722 | A1* | 12/2006 | Polan et al. | 370/352 |
| 2010/0122065 | A1* | 5/2010 | Dean et al. | 712/203 |

OTHER PUBLICATIONS

Newman, Andre, et al.; "Scalable Semantics—the Silver Lining of Cloud Computing"; Fourth IEEE International Conference on eScience; pp. 111-118; 2008.

* cited by examiner

*Primary Examiner* — Hee Soo Kim
(74) *Attorney, Agent, or Firm* — Steven M. Greenberg, Esq.; CRGO Law

(57) ABSTRACT

Embodiments of the present invention include a method for resource optimization of map/reduce computing in a computing cluster. The method can include receiving a computational problem for processing in a map/reduce module, subdividing the computational problem into a set of subproblems and mapping a selection of the sub-problems in the set to respective nodes in a computing cluster, for example a cloud computing cluster, computing for a subset of the nodes in the computing cluster a required resource capacity of the subset of the nodes to process a mapped one of the subproblems and an existing capacity of the subset of the nodes, and augmenting the existing capacity to an augmented capacity when the required resource capacity exceeds the existing capacity, and when a cost of augmenting the existing capacity to the augmented capacity does not exceed a penalty for breaching a service level agreement (SLA) for the subset of the nodes.

15 Claims, 2 Drawing Sheets

OPTIMIZED RESOURCE MANAGEMENT FOR MAP/REDUCE COMPUTING

BACKGROUND OF THE INVENTION

1. Field of the Invention

The present invention relates to distributed computing for large data sets on clusters of computers and more particularly to the optimization of resource utilization in Map/Reduce computing.

2. Description of the Related Art

Application server clusters have become common in the field of high-availability and high-performance computing. Application server clusters have become common because application cluster-based systems exhibit three important and fundamental characteristics or properties: reliability, availability and serviceability. Each feature will be understood to be of paramount importance when designing a robust clustered system. Generally, a clustered system consists of multiple application server instances grouped together in a server farm of one or more server computing nodes connected over high-speed network communicative linkages. Further, each application server instance in the application cluster can enjoy access to memory, possibly disk space and the facilities of a host operating system.

Among the many challenges faced by those who manage the capacity and performance of a clustered system is the allocation of network resources for consumption by a particular application or workload. Network resources in a cluster can be managed through agents known as workload managers. The workload managers can optimally assign different network resources within endpoint containers to handle selected workloads in an application. In many cases, workload managers can adjust the assignment of network resources based upon performance metrics measured through systems management components in the clustered system.

Clustered systems provide a natural infrastructure for use in modern Map/Reduce computing—a widely understood parallel programming technique for solving computational problems—those descriptions of computations to be performed by one or more computing resources to produce zero or more results. Of note, Map/Reduce computing can occur in "cloud" computing environments utilizing clustered systems. More particularly, Map/Reduce is a framework for processing huge datasets on certain kinds of distributable problems using a large number of computers (nodes), collectively referred to as a "cloud" or "cluster". Computational processing can occur on data stored either in a file system (unstructured) or within a database (structured). For the uninitiated, cloud computing refers to an Internet-based computing paradigm in which shared resources, software and information are provided to computers and other devices on-demand, much like electricity is provided to consumers over an electricity grid. Access to the resources of the "cloud" are governed by points of entry to the "cloud" that manage the relationship between the resource consumer according to the terms of a service level agreement ("SLA") at a cost tracked on behalf of the consumer.

As it is well known, Map/Reduce has two main components a "Map" step and a "Reduce" step. In the "Map" step, the master node accepts input, chops the input into smaller sub-problems, and distributes those smaller sub-problems to correspondingly different worker nodes. (A worker node may do this again in turn, leading to a multi-level tree structure). The worker node in turn processes that smaller problem, and passes the answer back to its master node. Thereafter, in the "Reduce" step, the master node then takes the answers to all the sub-problems and combines them in a way to get the output—the answer to the problem it was originally trying to solve.

One advantage of Map/Reduce is that Map/Reduce allows for distributed processing of the map and reduction operations. Provided each mapping operation is independent of the other, all maps can be performed in parallel—though in practice it is limited to either or both of the data source and the number of central processing units (CPUs) near that data. Similarly, a set of 'reducers' can perform the reduction phase—all that is required is that all outputs of the map operation that share the same key are presented to the same reducer, at the same time. While this process can often appear inefficient compared to algorithms that are more sequential, Map/Reduce can be applied to significantly larger datasets than "commodity" servers can handle—a large server farm can use Map/Reduce to sort a petabyte of data in only a few hours. The parallelism also offers some possibility of recovering from partial failure of servers or storage during the operation: if one mapper or reducer fails, the work can be rescheduled—assuming the input data are still available.

BRIEF SUMMARY OF THE INVENTION

Embodiments of the present invention address deficiencies of the art in respect to map/reduce computing and provide a novel and non-obvious method, system and computer program product for resource optimization of map/reduce computing in a computing cluster. In an embodiment of the invention, a method for resource optimization of map/reduce computing in a computing cluster can include receiving a computational problem for processing in a map/reduce module executing in memory by at least one processor of a computer. The method further can include subdividing the computational problem into a set of sub-problems and mapping a selection of the sub-problems in the set to respective nodes in a computing cluster. The method yet further can include computing for a subset of the nodes in the computing cluster a required resource capacity of the subset of the nodes to process a mapped one of the sub-problems and an existing capacity of the subset of the nodes. Finally, the method can include augmenting the existing capacity of the subset of the nodes to an augmented capacity when the required resource capacity exceeds the existing capacity, and when a cost of augmenting the existing capacity to the augmented capacity does not exceed a penalty for breaching a service level agreement (SLA) for the subset of the nodes.

In another embodiment of the invention, a map/reduce data processing system can be provided to include a computer with at least one processor and memory communicatively coupled to a computing cluster of nodes over a computer communications network and hosting execution of a map/reduce module. The system also can include an SLA stored in fixed storage coupled to the computer. Finally, the system can include optimized resource management logic coupled to the map/reduce module. The logic can include program code enabled to compute for a selected node in the computing cluster a required resource capacity of the selected node to process a mapped sub-problem of a computational problem submitted to the map/reduce module and an existing capacity of the selected node, and to augment the existing capacity of the selected node to an augmented capacity when the required resource capacity exceeds the existing capacity, and when a cost of augmenting the existing capacity to the augmented capacity does not exceed a penalty for breaching the SLA.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for resource optimization of map/reduce computing in a computing cluster. In accordance with an embodiment of the invention, a problem submitted for map/reduce processing can be divided into multiple different sub-problems and a selection of the sub-problems can be mapped to a node in a computational cluster, such as a cluster present within a computing cloud. For each node, a required capacity to solve the sub-problem can be determined and compared to an existing capacity of the node. When the existing capacity meets or exceeds the required capacity, the sub-problem can be assigned to the node. Otherwise, a cost of augmenting the node can be compared to a cost for breaching an SLA associated with the node. If the cost of augmenting the node does not exceed a threshold difference with the cost of breaching the SLA, the node can be augmented. In either event, the sub-problem can be assigned to the node.

Figure 1:
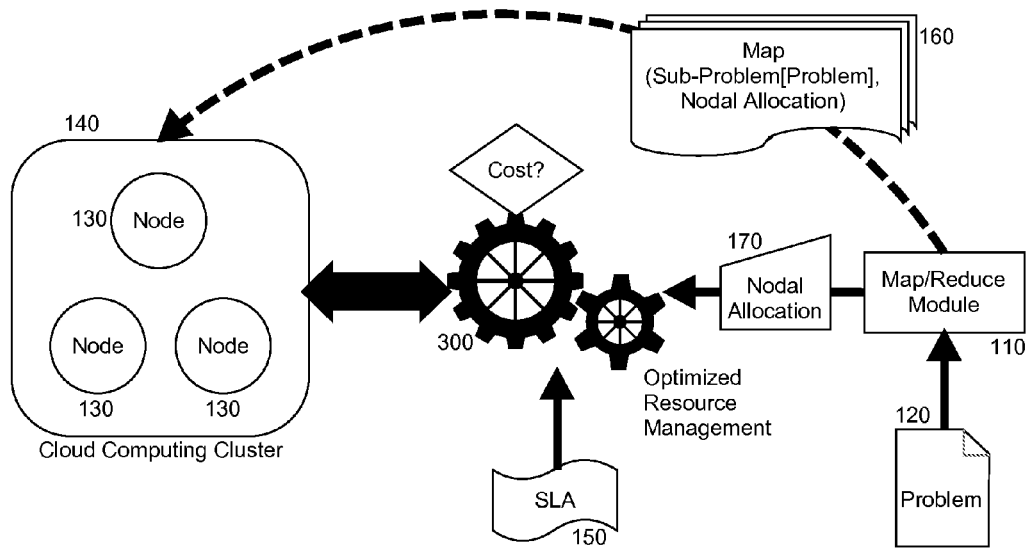
FIG. 1 is a pictorial illustration of a process for resource optimization of map/reduce computing in a computing cluster.

In further illustration, FIG. 1 pictorially depicts a process for resource optimization of map/reduce computing in a computing cluster. As shown in FIG. 1, a cloud computing cluster 140 of multiple different computing nodes 130 in a computing cloud can be provided. A map/reduce module 110 configured to engage in a map/reduce process for a selected computation problem 120, can subdivide the problem 120 into a set of sub-problems 160 and can be individually assigned to different ones of the nodes 130 in the cloud computing cluster 140 (a subset of the nodes 130) according to a map step of the map/reduce process. The nodal allocation 170 for the sub-problems 160 can be analyzed by optimized resource management system 300 to determine whether or not each of the nodes 130 in the nodal allocation 170 enjoys enough resource capacity (memory, bandwidth, disk storage space, etc.) to manage a corresponding assignment in the nodal allocation 170.

In the event that a given one of the nodes 130 in the cloud computing cluster 140 corresponding to a specified one of the sub-problems 160 in the nodal allocation 170 does not enjoy enough resource capacity to manage the assignment of the specified one of the sub-problems 160, a cost can be computed to augment the given one of the nodes 130 with additional resources necessary to elevate the given one of the nodes 130 to the required resource capacity. Examples include activating additional computing devices in the given one of the nodes 130, provisioning additional bandwidth, launching additional virtual machines, acquiring additional memory, activating additional processors, and the like. The computed cost can be compared to a cost of breaching an SLA 150 for the given one of the nodes 130. To the extent that the computed cost is deemed within a threshold value to be equal or better than the cost of breaching the SLA 150, the resource capacity of the given one of the nodes 130 can be augmented.

Figure 2:
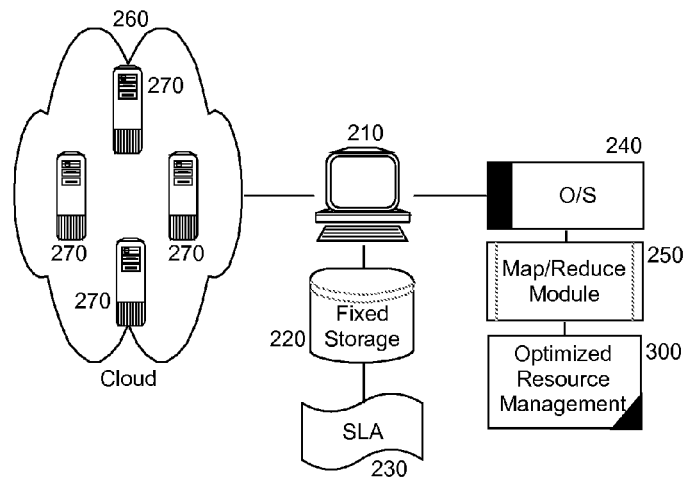
FIG. 2 is a schematic illustration of a computing cluster configured for resource optimization of map/reduce computing; and, FIG. 3 is a flow chart illustrating a process for resource optimization of map/reduce computing in a computing cluster.

The process described in connection with FIG. 1 can be implemented within a clustered data processing system of a computing cloud. In yet further illustration, FIG. 2 is a schematic illustration of a cloud computing cluster configured for resource optimization of map/reduce computing and to which access is managed by one or more computing points of access in order to govern access to the computing cloud according to the terms of an SLA for consumers seeking access to the computing cloud. The system of FIG. 2 can include a host computer 210 with at least one processor and memory managing access to a cloud computing cluster 260 of multiple different computing nodes 270 such as complete servers, individual virtual machines executing in one or more servers, or processor cores, to name only a few possibilities. The host computer 210 can be configured to manage access to the cloud computing cluster 260 according to an SLA 230 in fixed storage 220 coupled to the host computer 210, and can include an operating system 240 hosting the execution of a map/reduce module 250 configured to perform both mapping and reduction of a computational problem in accordance with the map/reduce programming model.

Optimized resource management logic 300 can be coupled to the map/reduce module 250. The optimized resource management logic 300 can include program code enabled to determine for each assigned one of the nodes 270 during a mapping step by the map/reduce module 250, whether or not the requisite capacity is available in the assigned one of the nodes 270 and if not, whether the cost of augmenting the capacity of the assigned one of the nodes 270 exceeds by a threshold margin the cost of breaching the SLA 230. If the cost of augmenting the capacity of the assigned one of the nodes 270 does not exceed by a threshold margin the cost of breaching the SLA 230, the augmentation can be directed, such as be provisioning additional processing cores, processors or servers, additional memory or bandwidth. Otherwise, a breach of the SLA 230 can be viewed as more cost effective. Thus, the process of assigning nodes during the mapping step of map/reduce can be optimized.

Figure 3:
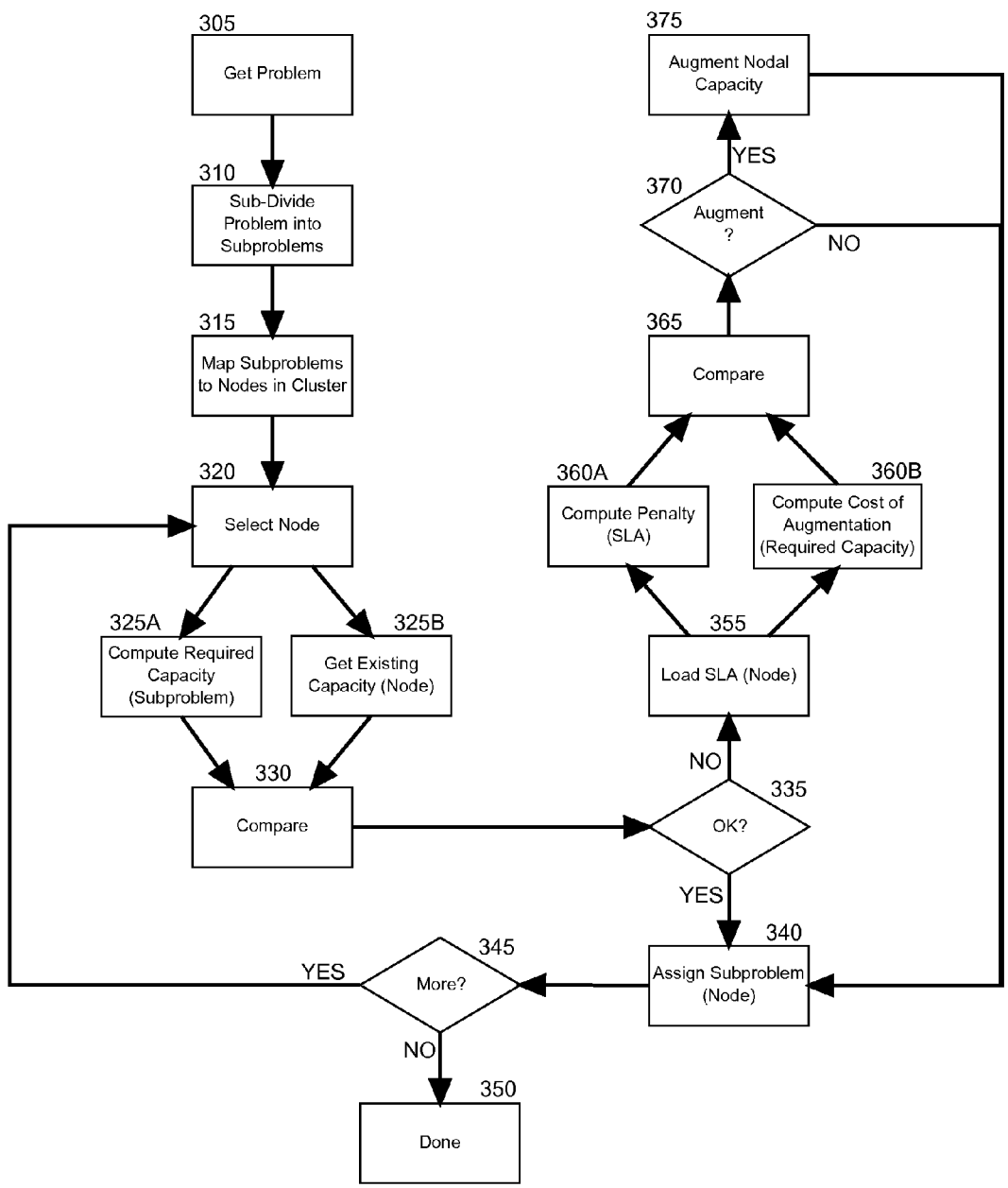

In yet further illustration of the operation of the optimized resource management logic 300, FIG. 3 is a flow chart illustrating a process for resource optimization of map/reduce computing in a computing cluster. Beginning in block 305, a computational problem can be received in a map/reduce module. In block 310, the problem can be subdivided according to the map/reduce framework and mapped to different nodes in a cloud computing cluster in block 315. In block 320, a first mapped node can be selected for processing. Thereafter, in block 325A, the resource capacity required of the selected node to process the sub-problem mapped to the selected node can be computed as can an existing capacity of the selected node in block 325B.

In block 330, the computed capacity required to process the sub-problem mapped to the selected node can be compared to the existing capacity of the selected node. In decision block 335, it can be determined if the existing capacity meets or exceeds the required capacity by or within a threshold amount (that can range from zero). If so, the sub-problem can be assigned to the selected node for processing in block 340 and the process can repeat if in decision block 345 it is determined that additional mapped nodes remain to be considered. In contrast, in decision block 335 if it is determined that the existing capacity does not meet or exceeds the required capacity by or within a threshold amount, in block 355 an SLA pertaining to access to the cloud computing cluster can be loaded for analysis.

In block 360, a penalty resulting from a breach of the SLA can be computed and in block 360B a cost of augmenting the existing capacity of the selected node to meet or exceed the required capacity by or within a threshold amount can be computed. In block 365, the computed values can be compared and in decision block 370, it can be determined whether the cost to augment the existing capacity of the selected node meets or exceeds by or within a threshold value (that can range from zero) the penalty resulting from a breach of the SLA. In the former instance, in block 375 the existing capacity of the selected node can be augmented, for example by provisioning additional memory, bandwidth or processors. Thereafter, in block 340 the sub-problem can be assigned to the selected node and the process can repeat if in decision block 345 it is determined that additional mapped nodes remain to be considered, but otherwise the process can end in block 350.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A map/reduce data processing system comprising:
    a computer with at least one processor and a memory communicatively coupled to a computing cluster of nodes over a computer communications network and hosting execution of a map/reduce module;
    a service level agreement (SLA) stored in a fixed storage coupled to the computer; and,
    optimized resource management logic coupled to the map/reduce module, the optimized resource management logic comprising program code enabled to compute for a subset of nodes in the computing cluster of nodes a required resource capacity of the subset of nodes to process a mapped sub-problem of a computational problem submitted to the map/reduce module and also an existing capacity of the subset of nodes, to determine whether the required resource capacity of the subset of nodes exceeds the existing capacity of the subset of nodes, upon determining that the required resource capacity of the subset of the nodes exceeds the existing capacity of the subset of the nodes, both determine a cost of augmenting the existing capacity to an augmented capacity to elevate the subset of the nodes to the required resource capacity and also determine a penalty for breaching the SLA, and to augment the existing capacity of the subset of nodes to the augmented capacity to elevate the subset of the nodes to the required resource capacity upon both determining that the required resource capacity exceeds the existing capacity and also upon determining that the cost of augmenting the existing capacity to the augmented capacity to elevate the subset of the nodes to the required resource capacity does not exceed the penalty for breaching the SLA.

2. The system of claim 1, wherein the computing cluster of nodes is a cloud computing cluster of nodes.

3. The system of claim 1, wherein the subset of nodes is a server in the computing cluster of nodes.

4. A computer program product for optimized resource management of map/reduce computing in a computing cluster, the computer program product comprising:
    a non-transitory computer readable storage medium having computer readable program code embodied therewith, the computer readable program code comprising:
    computer readable program code for receiving a computational problem for processing in a map/reduce module executing in a memory by at least one processor of a computer;
    computer readable program code for subdividing the computational problem into a set of sub-problems and mapping a selection of the sub-problems in the set of sub-problems to respective nodes in the computing cluster;
    computer readable program code for computing for a subset of the nodes in the computing cluster a required resource capacity of the subset of the nodes to process a mapped one of the sub-problems and also an existing capacity of the subset of the nodes;
    computer readable program code for determining whether the required resource capacity of the subset of the nodes exceeds the existing capacity of the subset of the nodes;
    computer readable program code for, upon determining that the required resource capacity of the subset of the nodes exceeds the existing capacity of the subset of the nodes, both determining a cost of augmenting the existing capacity to an augmented capacity to elevate the subset of the nodes to the required resource capacity and also determining a penalty for breaching a service level agreement (SLA) for the computing cluster; and,
    computer readable program code for augmenting the existing capacity of the subset of the nodes to the augmented capacity to elevate the subset of the nodes to the required resource capacity upon both determining that the required resource capacity exceeds the existing capacity, and also upon determining that the cost of augmenting the existing capacity to the augmented capacity to elevate the subset of the nodes to the required resource capacity does not exceed a penalty for breaching the SLA for the computing cluster.

5. The computer program product of claim 4, wherein the computing cluster is a cloud computing cluster.

6. The computer program product of claim 4, wherein the computer readable program code for augmenting the existing capacity of the subset of the nodes to the augmented capacity to elevate the subset of the nodes to the required resource capacity comprises computer readable program code for provisioning additional servers in the computing cluster for the subset of the nodes.

7. The computer program product of claim 4, wherein the computer readable program code for augmenting the existing capacity of the subset of the nodes to the augmented capacity to elevate the subset of the nodes to the required resource capacity comprises computer readable program code for provisioning additional memory in the subset of the nodes.

8. The computer program product of claim 4, wherein the computer readable program code for augmenting the existing capacity of the subset of the nodes to the augmented capacity to elevate the subset of the nodes to the required resource capacity comprises computer readable program code for provisioning additional processors in the subset of the nodes.

9. The computer program product of claim 5, wherein the computer readable program code for augmenting the existing capacity of the subset of the nodes to the augmented capacity to elevate the subset of the nodes to the required resource capacity comprises computer readable program code for augmenting the existing capacity of the subset of the nodes to the augmented capacity when the required resource capacity exceeds by a first threshold value of the existing capacity, and also when the cost of augmenting the existing capacity to the augmented capacity does not exceed beyond a second threshold value of a penalty for breaching a service level agreement (SLA) for the cloud computing cluster.

10. The system of claim 1, wherein the program code enabled to augment the existing capacity of the subset of nodes to the augmented capacity to elevate the subset of the nodes to the required resource capacity comprises program code to provision additional servers in the computing cluster of nodes for the subset of the nodes.

11. The system of claim 1, wherein the program code enabled to augment the existing capacity of the subset of nodes to the augmented capacity to elevate the subset of the nodes to the required resource capacity comprises program code to provision additional memory in the subset of the nodes.

12. The system of claim 1, wherein the program code enabled to augment the existing capacity of the subset of nodes to the augmented capacity to elevate the subset of the nodes to the required resource capacity comprises program code to provision additional processors in the subset of the nodes.

13. The system of claim 2, wherein the program code enabled to augment the existing capacity of the subset of nodes to the augmented capacity to elevate the subset of the nodes to the required resource capacity comprises program code to augment the existing capacity of the subset of the nodes to the augmented capacity when the required resource capacity exceeds by a first threshold value of the existing capacity, and also when the cost of augmenting the existing capacity to the augmented capacity does not exceed beyond a second threshold value of a penalty for breaching a service level agreement (SLA) for the cloud computing cluster.

14. The system of claim 1, wherein the program code enabled to augment the existing capacity of the subset of nodes to the augmented capacity to elevate the subset of the nodes to the required resource capacity comprises program code to provision additional bandwidth in the subset of the nodes.

15. The computer program product of claim 4, wherein the computer readable program code for augmenting the existing capacity of the subset of the nodes to the augmented capacity to elevate the subset of the nodes to the required resource capacity comprises computer readable program code for provisioning additional bandwidth in the subset of the nodes.

\* \* \* \* \*